United States Patent
DeMers et al.

(10) Patent No.: US 9,505,497 B2
(45) Date of Patent: Nov. 29, 2016

(54) SYSTEMS AND METHODS FOR A VIRTUAL TERRAIN DISPLAY

(75) Inventors: Robert E. DeMers, Nowthen, MN (US); Stephen Mead, Bradenton, FL (US); Jeff Lancaster, Plymouth, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 968 days.

(21) Appl. No.: 13/207,010

(22) Filed: Aug. 10, 2011

(65) Prior Publication Data
US 2013/0038631 A1 Feb. 14, 2013

(51) Int. Cl.
G09G 5/00 (2006.01)
B64D 11/00 (2006.01)
G09F 21/08 (2006.01)

(52) U.S. Cl.
CPC .......... *B64D 11/0015* (2013.01); *G09F 21/08* (2013.01); *B64D 2011/0061* (2013.01)

(58) Field of Classification Search
CPC ................. B64D 11/0015; B64D 2011/0061; G09F 21/08
See application file for complete search history.

(56) References Cited

U.S. PATENT DOCUMENTS

| | | | |
|---|---|---|---|
| 4,954,970 A | 9/1990 | Walker | |
| 5,253,051 A | 10/1993 | McManigal | |
| 6,208,933 B1 | 3/2001 | Lazar | |
| 6,798,408 B2 * | 9/2004 | Tokuyama et al. | 345/426 |
| 7,864,176 B2 | 1/2011 | Planck | |
| 7,920,968 B2 | 4/2011 | Chapin | |
| 7,933,395 B1 | 4/2011 | Bailly | |
| 2005/0197763 A1 | 9/2005 | Robbins | |
| 2005/0280706 A1 | 12/2005 | Jong | |
| 2006/0167630 A1 | 7/2006 | Noma | |
| 2008/0021636 A1 * | 1/2008 | Stavaeus et al. | 701/207 |
| 2008/0158371 A1 * | 7/2008 | Trescott | 348/208.7 |
| 2010/0125412 A1 | 5/2010 | Suddreth | |
| 2010/0188506 A1 | 7/2010 | Dwyer et al. | |

FOREIGN PATENT DOCUMENTS

| | | |
|---|---|---|
| FR | 2854374 A1 | 11/2004 |
| JP | 2000350195 A | 12/2000 |

OTHER PUBLICATIONS

EP Extended Search Report for Application No. 12 178 564.6 dated Jul. 11, 2013.
EP Office Action for Application No. 12 178 564.6 dated Sep. 13, 2013.
EP Communication, EP 12178564.6-1754 dated Mar. 24, 2014.

* cited by examiner

*Primary Examiner* — James A Thompson
*Assistant Examiner* — Tapas Mazumder
(74) *Attorney, Agent, or Firm* — Lorenz & Kopf, LLP

(57) ABSTRACT

Embodiments of the present invention provide improved systems and methods for providing a virtual terrain display. In one embodiment, a method comprises identifying a location within an enclosure. The location is referenced against an external environment containing the enclosure. The method also comprises identifying a portion of a structure of the enclosure. The portion of the structure exists between the location and the external environment and blocks a view of the external environment. The method also comprises generating a display depicting a view of the external environment from the location; and applying a translucent structure representation to the display. The structure representation is a visual depiction of the portion of the structure and appearing in front of the depicted view without blocking the depicted view of the external environment.

15 Claims, 7 Drawing Sheets

SYSTEMS AND METHODS FOR A VIRTUAL TERRAIN DISPLAY

BACKGROUND

Aircraft cabins commonly include virtual displays to show passengers the view from the side or front windows of the aircraft. One way to display these views includes showing as much of the outside environment of the aircraft as can fit on a display screen. Alternatively, a display can provide a virtual window that is overlaid onto the image of the external environment, the virtual window framing the view to match the view through the real windows of the aircraft. However, when the display screen shows as much of the external environment as can fit on the display screen, the display lacks visual cues that aid users when looking for specific landmarks through a real window. While the virtual window provides visual cues to a user, the virtual window also conceals information behind the virtual frame, potentially hiding desired points of interest from the view of a passenger.

SUMMARY

The Embodiments of the present invention provide systems and methods for a virtual terrain display and will be understood by reading and studying the following specification.

Embodiments of the present invention provide improved systems and methods for providing a virtual terrain display. In one embodiment, a method comprises identifying a location within an enclosure. The location is referenced against an external environment containing the enclosure. The method also includes identifying a portion of a structure of the enclosure. The portion of the structure exists between the location and the external environment and blocks a view of the external environment. The method also includes generating a display depicting a view of the external environment from the location; and applying a translucent structure representation to the display. The structure representation is a visual depiction of the portion of the structure and appears in front of the depicted view without blocking the depicted view of the external environment.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
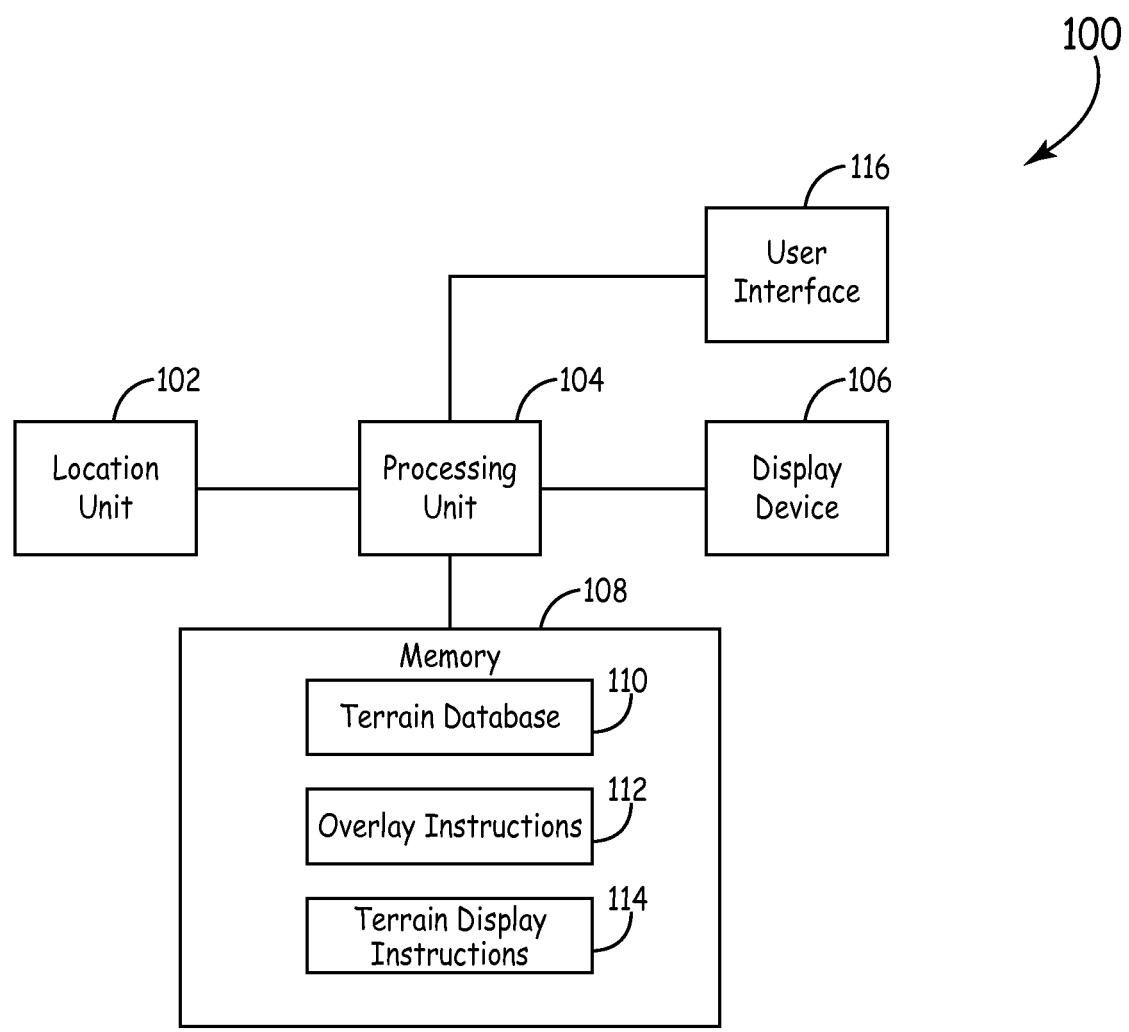
FIG. 1 is a block diagram of one embodiment of a system for displaying a virtual terrain within an enclosure.

In accordance with common practice, the various described features are not drawn to scale but are drawn to emphasize specific features relevant to the exemplary embodiments.

DETAILED DESCRIPTION

In the following detailed description, references are made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment for a system 100 for displaying a virtual terrain within an enclosure. The term "enclosure," as used herein, refers to an enclosed space within an environment where the structure of the enclosure blocks the view from within the enclosure. For example, an enclosure is an aircraft cabin, a building, a car, a spacecraft, a boat and the like. The term structure as used herein refers to an object that is part of the enclosure or an object that is outside the enclosure. For example, a structure includes a wall of the enclosure, a wing, an engine nacelle, a building, a tower, a cloud, moving vehicles, and the like. A structure blocks the view if it prevents a person inside the enclosure from viewing the external environment. The external environment is the environment that contains the enclosure that is outside of the enclosure. System 100 includes a location device 102 for determining the location of the enclosure in relation to an external environment that contains the enclosure. For example, location device 102 determines the location of an airplane in relation to the Earth. In some implementations, location device 102 determines the position, attitude, and heading of the enclosure. For example, location device 102 includes a navigation unit like a GPS, an Inertial Measurement Unit, and the like. When location device 102 determines the location of the enclosure within the external environment, system 100 processes the location information on a processing unit 104 and uses data stored in a memory 108 to display a virtual view of the environment on a display device 106.

Processing Unit 104 includes at least one electronic device that accepts data and performs mathematical and logical operations. Processing unit 114 includes or functions with software programs, firmware, or other computer readable instructions for carrying out various methods, process tasks, calculations, and control functions used in implementing the functionality described below. These instructions are typically stored on any appropriate computer or machine readable medium used for storage of computer readable instructions or data structures, such as memory 108.

Memory 108 includes at least one device that can hold data in a machine readable medium. The computer readable medium is accessed by a general purpose or special purpose computer or processor, or other programmable logic device. Suitable computer or processor readable media includes storage/memory media such as magnetic or optical media. For example, storage/memory media includes conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media also includes transmission media such as electrical, electromagnetic, or digital signals, conveyed via a communication medium such as a network and/or a wireless link. The computer-readable medium together with instructions embodied thereon comprise a program product.

Memory 108 stores a terrain database 110. The phrase "terrain database," as used herein, refers to a database that stores information describing the terrain through which an enclosure is traveling. For example, terrain database 110 stores information that describes the terrain of the Earth. In one implementation, terrain database 110 includes satellite imagery of the world. Alternatively, terrain database 110 includes a digital representation of the Earth's terrain like a digital elevation model, a digital terrain model, a vertical obstruction database, and the like. Further, terrain database 110 stores descriptive information that identifies and describes features that are recognizable when the terrain represented by the terrain database is shown on display device 106. Descriptive information describes landmarks, points of interest, geographical features, and the like. For example, descriptive information describes the location of mountains, historical sites, rivers, canyons, cities, political borders, roads, and the like. Also, terrain database 110 can include a weather database that stored weather information associated with a particular terrain. Terrain database 110 can reside on memory 108 stored in the enclosure or on a memory located away from the enclosure. When terrain database 110 is stored in a memory away from the enclosure, processing unit 104 acquires the information stored in terrain database 110 by communicating through a wireless network or other form of communication.

In some implementations, memory 108 stores terrain display instructions 114. The phrase "terrain display instructions," as used herein, refers to computer instructions that direct processing unit 104 to access terrain database 110 and create displayable information representing the view of the external environment based on the location of the enclosure received from location device 102. For example, when the enclosure is an aircraft, the location received from location device 102 includes altitude, position, heading, and attitude. Alternatively, processing unit 104 receives location information from other vehicles. For instance, when the enclosure is part of an aircraft equipped with ADS-B, the aircraft can receive location information from other nearby aircraft. Processing unit 104 uses the altitude, position, heading, and attitude to produce displayable information representing the view of the Earth's terrain from the aircraft. The phrase "displayable information", as used herein, refers to machine readable information that directs a display device to render a recognizable image. Processing unit 104 transmits the displayable information to display device 106. Upon reception of the displayable information, display device 106 displays an image to a viewer based on the displayable information. For example, when processing unit 104 transmits information to display device 106 associated with the external environment of the enclosure, display device 106 renders the displayable information as a virtual view of the external environment from the location of the enclosure. In some implementations, display device 106 renders the displayable information as a three dimensional view of the external environment. Alternatively, display device 106 renders the displayable information as a two dimensional view of the external environment.

In a further implementation, memory 108 stores overlay instructions 112. The phrase "overlay instructions", as used herein, refers to computer instructions stored in memory 108 that direct processing unit 104 to alter the displayable information associated with a view of the external environment by including overlay information in the displayable information. Display device 106 renders the overlay information as a virtual representation of a portion of the enclosure structure overlaid on the virtual view of the external environment. For example, when the enclosure is an airplane, overlay instructions 112 direct processing unit 104 to alter the displayable information to include overlay information representing a structure of the airplane, such as cabin walls, the bulkhead, and the like. When display device 106 renders the displayable information, a virtual representation of the airplane structure appears to lie in front of the virtual view of the terrain. Further, overlay instructions 112 instructs processing unit 104 to identify portions of the structure that obstruct the view of the external environment from within the enclosure, and then virtually represent the identified portion of the structure in the displayable information. For example, when the virtual view of the terrain depicted on display device 106 represents the view through the right side of an airplane, overlay instructions 112 causes processing unit 104 to overlay the virtual view of the terrain with a virtual representation of the right side of the airplane.

In a further embodiment, when overlay instructions 112 instructs processing unit 104 to augment the displayable information with overlay information, the overlay information represents a translucent depiction of the enclosure structure. The term "translucent," as used herein, refers to a depiction that allows details of other images to be seen through the depiction. When the overlay information representing the translucent depiction is displayed on display device 106, display device 106 depicts the represented structure such that a viewer can recognize the virtual view of the external environment through the overlaid translucent structure. For example, on an aircraft, overlay instructions 112 instruct processing unit 104 to overlay a translucent representation of a cabin wall over the virtual view of the external environment. When the representation that includes the translucent cabin walls overlaid on the representation of the external environment is transmitted to display device 106, a passenger could look through a window in the cabin wall while knowing where to look for points of interest shown in the representation of the external environment. By overlaying the external environment with a translucent representation of the structure of the enclosure, a passenger can use depicted images as a guide to identify points of interest when looking at the actual external environment after viewing the virtual depiction of the external environment on display device 106.

Display device 106 receives displayable data from processing unit 104. Display device 106 is any device capable of rendering a visual display. For example, display device 106 is at least one of a projector, a television screen, a monitor, a flexible display, a personal electronic device and the like. Further, display device 106 includes a single display or multiple displays. For instance, in an airplane, display device 106 provides a single display at the bulkhead of the cabin for viewing by all of the passengers in the airplane. The single display provides a single constant view from a predetermined location of the aircraft or the single display periodically changes the depicted view to represent the view from different locations from within the enclosure.

In an alternative implementation, display device 106 includes multiple displays. For instance, display device 106 provides individual displays for each passenger in the airplane by providing images on screens mounted on the back of each seat in a cabin. In a further implementation, display device 106 includes two displays representing different sides of an enclosure. Alternatively, display device 106 provides a wireless local area network whereupon personal electronic devices connect to the network to access the displayable information. In at least one embodiment, display device 106 includes a flexible display attached to the walls of the airplane. The flexible display depicts a virtual view of the external environment as if the structure of the enclosure did not separate the viewer from the external environment. Display device 106 provides a display such that the viewers of the display within the enclosure can relate the position and orientation of a view from a particular location to features contained in the external environment.

System 100 also includes a user interface 116. User interface 116 allows a user to interface with processing unit 104 to control what is displayed on display 106. For example, user interface 116 allows a user to select a view from a particular location in the enclosure along with the accompanying translucent overlay representing the structure of the enclosure at the particular location. For example, a passenger sitting in the back of an airplane may desire to see the view from the seats in the front of the airplane. User interface 116 allows the passenger to switch views from the back of the airplane to the front of the airplane, thus allowing the passenger to see the view from different locations from the enclosure. Further, when a user desires the optimal view of a point of interest in the virtual depiction of the external environment, a user can enter the desired point of interest on user interface 116 and display 106 directs the user to the location in the enclosure that will provide the best view of the point of interest. In another implementation, user interface 116 provides the option of viewing weather patterns in various degrees of translucency to aid a user in finding the location of a point of interest when weather interferes with the view from within the enclosure.

In certain embodiments, system 100 is a mobile device such as a tablet computer, a cellular phone, and the like. Further, user interface 116 interacts with the user via the user interface of the mobile device. For example, when the mobile device is a tablet computer, user interface 116 interacts with the user via a touchscreen, a keyboard, a mouse, a microphone, and the like. Also, in some embodiments, the mobile device contains an internal location unit 102. For example, the mobile device includes an internal GPS and attitude sensor, where the attitude sensor includes at least one gyroscope and at least one accelerometer. Internal location unit 102 enables the device to display a view of an external environment that corresponds to the position of the mobile device. In some embodiments, the mobile device communicates with a location unit within the enclosure to provide a representation of a structure of the enclosure on the mobile device.

System 100 aids users in orienting themselves within an enclosure with respect to a virtual depiction of the environment outside of the enclosure. System 100 provides relational markers representing translucent representations of the structure of the enclosure applied to the depiction of the external environment. The translucency of the relational markers allows a user to view the virtual depiction while providing a reference to locations within the enclosure.

Figure 2:
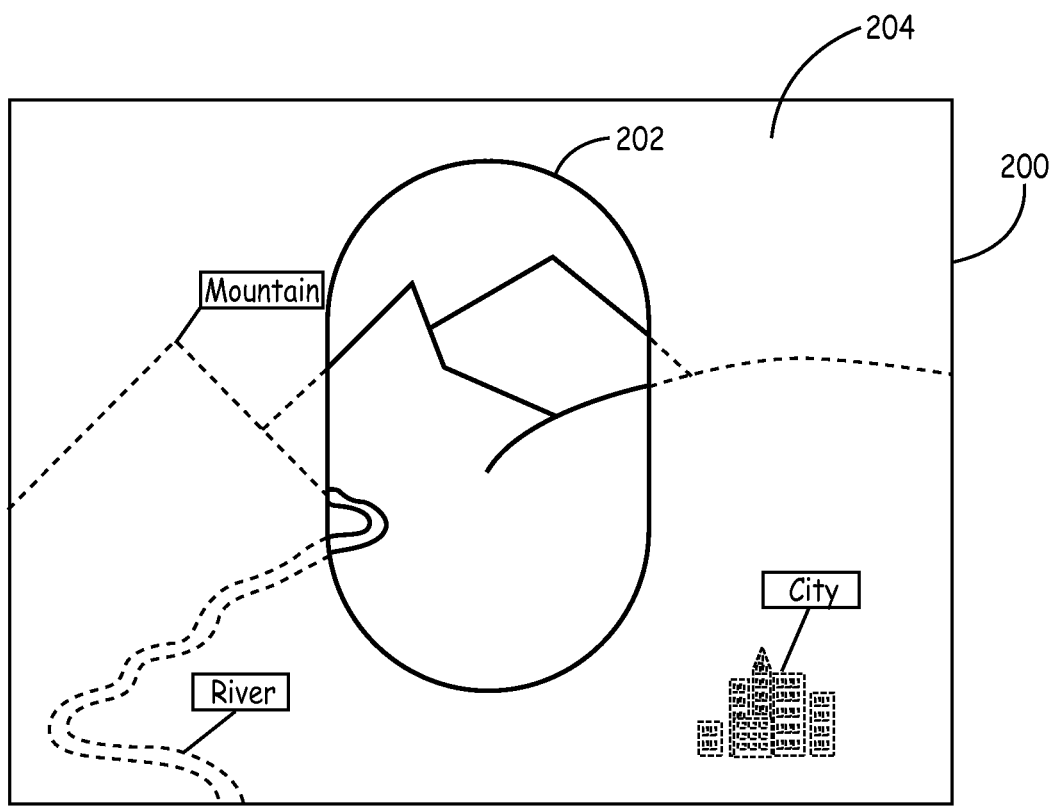
FIG. 2 is an illustration of a display on a display device according to one embodiment.

FIGS. 2-5 illustrate different depictions of the external environment from within an enclosure on a display device 106. FIG. 2 is an illustration of a display 200 on a display device 106. In some implementations, a user within an enclosure views the external environment through a window. Display 200 provides a depicted scene 204 of the external environment from within the enclosure along with a virtual window 202 to aid the user in orienting his position in respect to the external environment. In some implementations, depicted scene 204 includes information that helps a user identify points of interest that are viewable from the enclosure. For example, depicted scene 204 includes labels identifying a mountain, a river, and a city as points of interest. However, frequently the points of interest are hidden from the view of the user by the structure of an enclosure, such as the cabin wall of an airplane. To orient the user to the location of the obscured points of interest, processing unit 104 alters depicted scene 204 by adding a translucent representation of the structure of the enclosure. For example, processing unit 104 alters depicted scene 204 by adding a translucent representation of the walls surrounding virtual window 202 as depicted by the dashed lines. In a further embodiment, a flexible display is applied to the wall surrounding a window. The flexible display depicts the external environment as seen around the window. For example, when the display is a flexible display, depicted scene 204 shows a view of the external environment as seen from the enclosure, while window 202 functions as a normal window through which a user can view the actual external environment.

Figure 3:
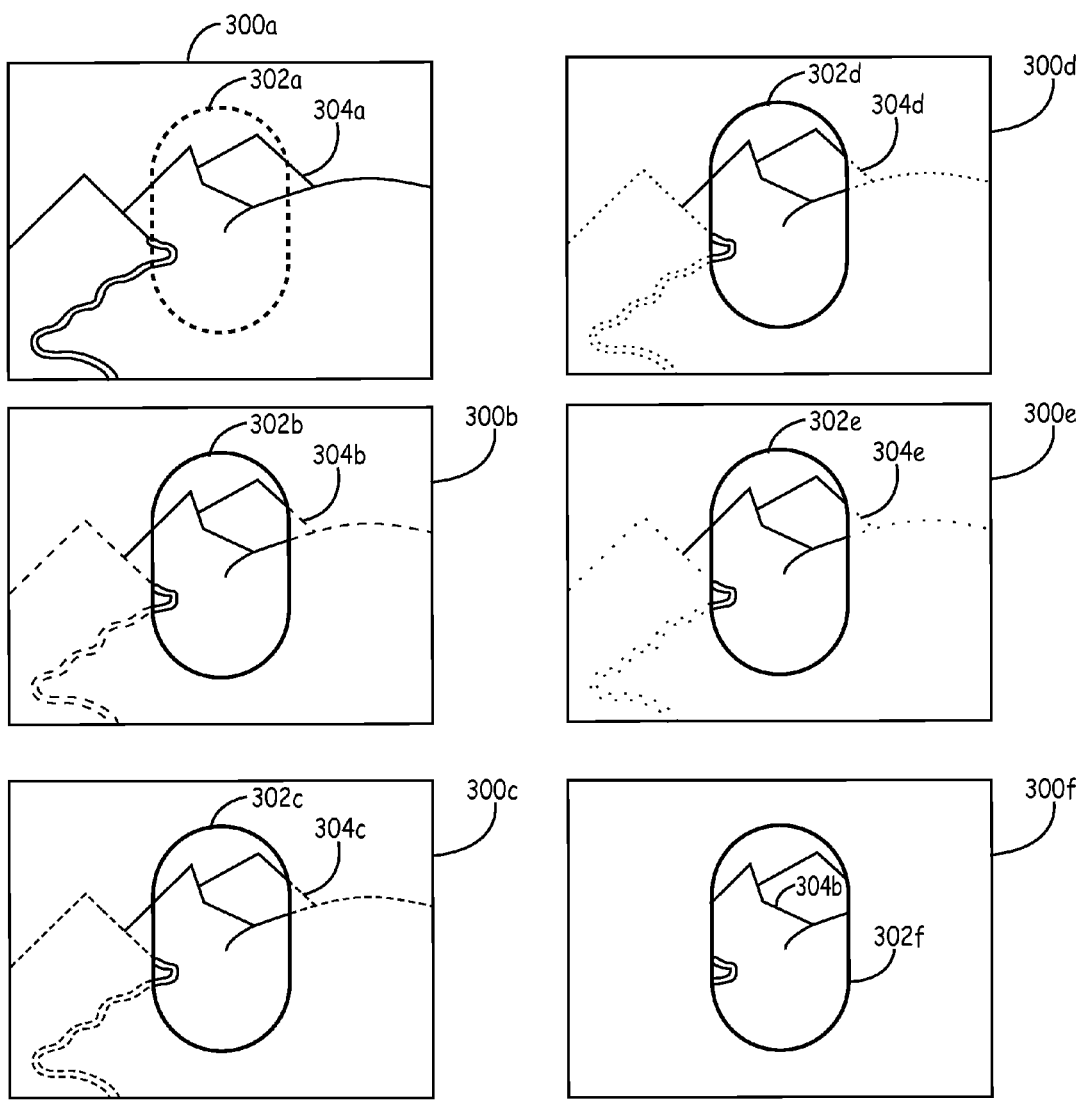
FIG. 3 is an illustration of a display on a display device with a variably translucent structure representation according to one embodiment.

FIG. 3 is an illustration of displays 300a-300f where a user interface 116 allows a user to control the translucency of the depicted structure representation. For example, in displays 300a-300f, the depicted structures have varying degrees of translucency between transparent and opaque. In depicted scene 300a, a user may set the depicted structure 302a of the enclosure to be transparent permitting an unobstructed view of the virtual external environment 304a on display 300a. In displays 300b-300e, a user may progressively increase the opacity of the depicted structure 302b-302e to hide the depicted scene or find a desired level of translucency for the depicted structure 302b-302e in relationship to the depicted external environment 304b-304e. In some implementations, user interface 116 provides the user with preset levels of translucency. Alternatively, user interface 116 allows the user to set the translucency to any setting between transparent and opaque. Further, user interface 116 allows a user to make the depicted structure representation 302f opaque as shown in display 300f, such that the depicted structure 302f hides the depicted external environment 304f on display 300f. In some implementations, user interface 116 allows a user to adjust the size of the depicted structure 302b-302e, by zooming in and out on the depicted structure 302b-302e. In some examples, when you zoom out to a substantial distance, display device 106 shows multiple views from within the enclosure.

Figure 4:
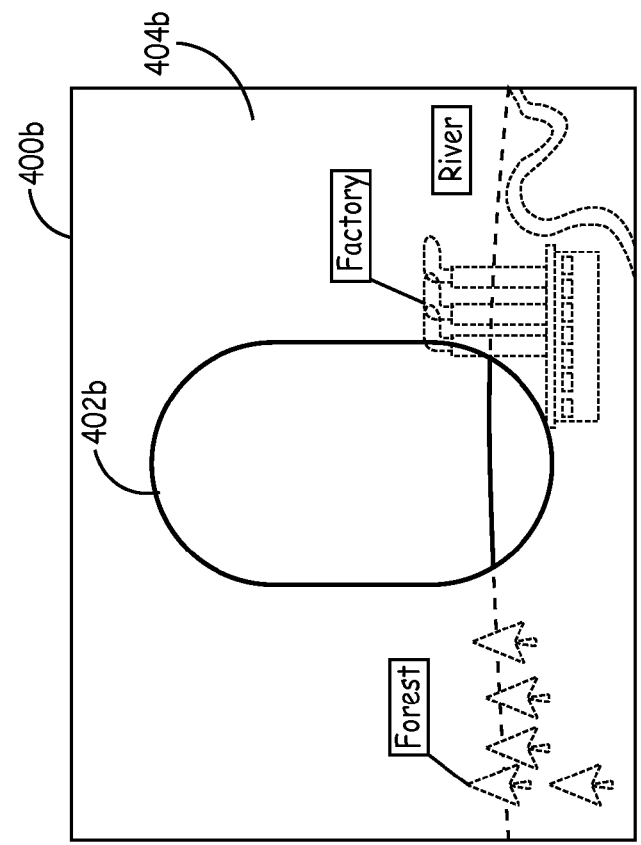
FIG. 4 illustrates multiple displays according to one embodiment.
Figure 4:
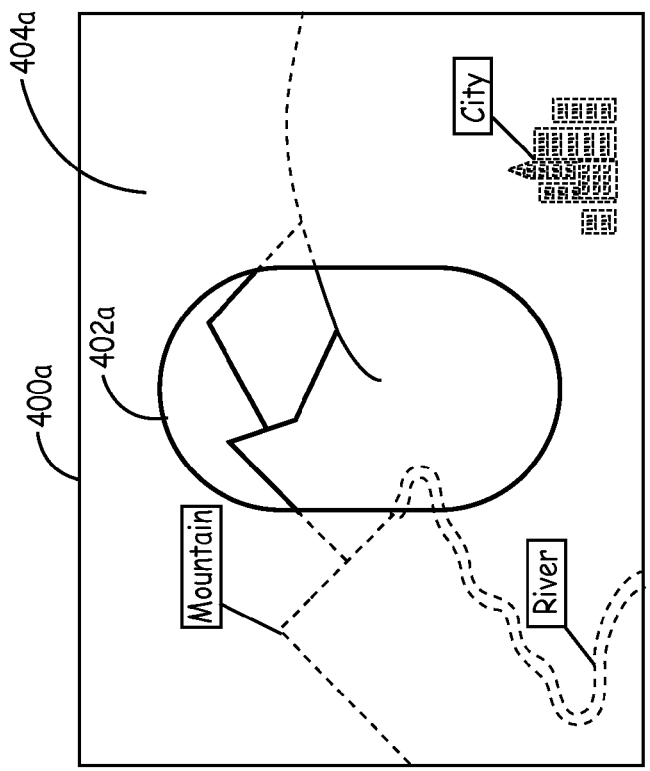

FIG. 4 illustrates multiple displays 400a-400b capable of showing the view from different locations in an enclosure. Multiple displays 400 include a first location display 400a and a second location display 400b. First location display 400a includes first location structure representation 402a and a first location depicted scene 404a illustrating the view from the first location within the enclosure. Second location display 400b includes second location structure representation 402b and a second location depicted scene 404b illustrating the view from the second location within the enclosure. By providing displays that show the view of the external environment from different locations within an enclosure and providing structure representations for orienting the view in relation to the enclosure, a viewer can select viewing location within the enclosure to acquire a desired view of the external environment. For example, display 400*b* indicates to a viewer sitting next to the structure displayed as structure representation 402*b* that the landmarks visible from that structure are a forest and a factory. Further, display 400*a* indicates to the same viewer that if the viewer were to move next to the structure represented in display 400*a* as structure representation 402*a*, the viewer would be able to see a mountain, a river, and a city. If the user desired a view of the mountain, the user could move next to structure representation 402*a*.

Figure 5:
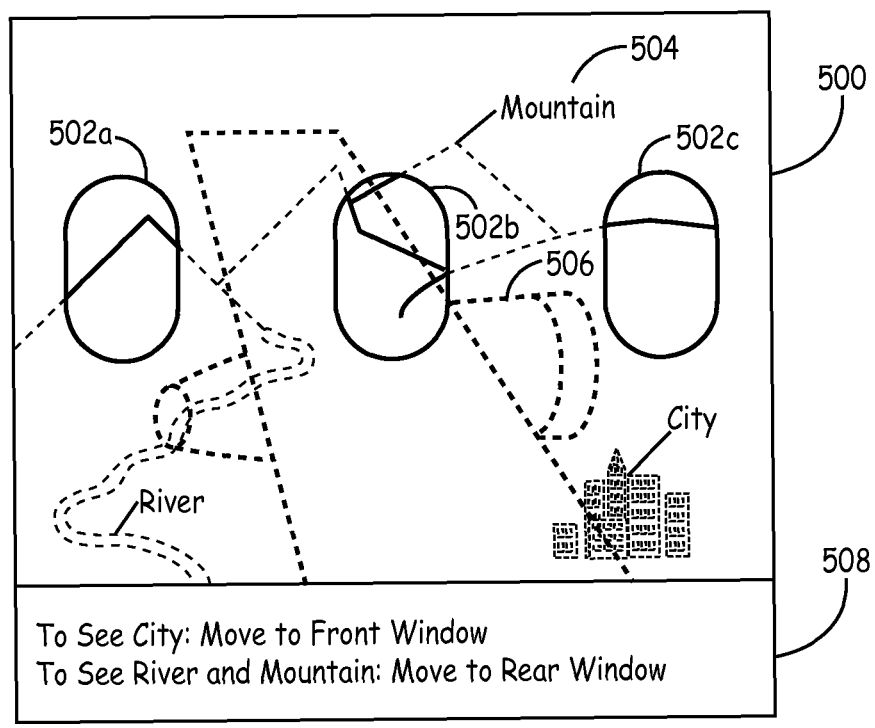
FIG. 5 illustrates a display showing multiple references features according to one embodiment.

FIG. 5 illustrates a display 500 showing multiple references features. Display 500 includes multiple internal structure representations 502*a-c*. Multiple internal reference structures 502*a-c* allow a viewer to select their view from within the enclosure. For example, a viewer near the structure represented by structure representation 502*c* can look at the display 500 and realize that the view of the river is better if the viewer were standing next to the physical structure represented by structure representation 502*a*. The viewer can then move next to the physical structure represented by structure representation 502*a* to see the view of the river from the enclosure near the physical structure depicted as structure representation 502*a*. In some implementations, display 500 includes external structure representation 506. External structure representation 506 shows the position of an external feature of the enclosure in reference to the depicted scene 504 and internal structure representations 502*a-c*. For example, when the enclosure is an airplane, display 500 includes a visual depiction of a wing as an external structure representation. The depiction of the external structure representation indicates to viewers within the enclosure that an external structure representation blocks the view of depicted scene 504 at certain locations within the enclosure. In some implementations, the depiction of the external structure representation 506 is translucent to allow a viewer to know what points of interest are obscured by external structure representation 506. Alternatively, external structure representation 506 is opaque to more accurately represent the view from within the enclosure.

In some implementations, display 500 includes an instruction panel 508. Instruction panel 508 provides instructions, aiding a user in finding locations within the enclosure from which to view desired points of interest. For example, if a user desires to see a city from a window in the enclosure, instruction panel 508 indicates to the user that the best location within the enclosure to see the city is the front window of the enclosure. Alternatively, if a user desires to see a river from a window in the enclosure, instruction panel 508 indicates to the user that the best location within the enclosure to see the river is the rear window of the enclosure. Further, user interface 116 allows user-entry of desired points of interest, in which instruction panel 508 responds by providing instructions about how to view the desired points of interest. The display 500 in conjunction with instruction panel 508 further aid a user in orienting themselves within an enclosure in relation to an external environment.

Figure 6:
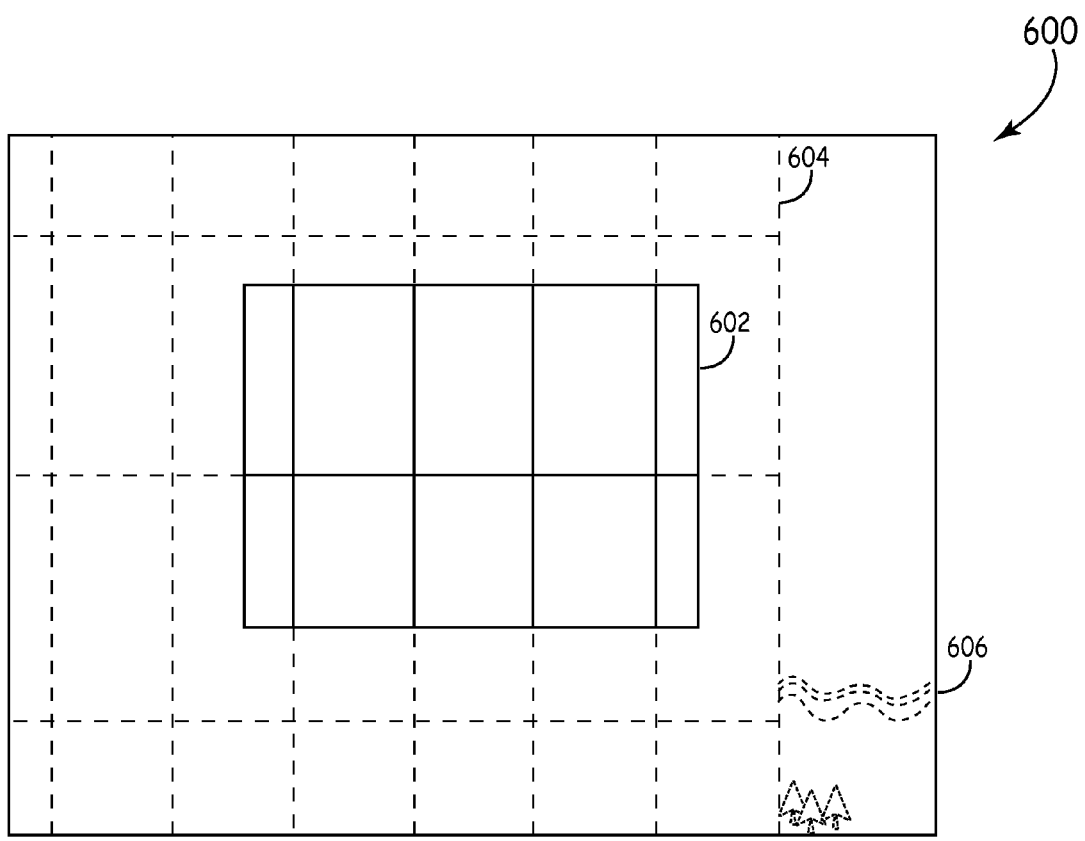
FIG. 6 illustrates a display from the inside of a building according to one embodiment.

FIG. 6 illustrates a display 600 showing embodiments of the present invention when viewed from a building. In certain applications, a display 600 provides a view from a building. The view from a building can aid a viewer in determining the location in the building that provides a desired view of the external environment of the building. For example, display 600 includes a virtual window 602 that depicts the view from outside a building. In display 600, a building 604 immediately obscures the view outside the window. However, the viewer may desire to see a view of beach 606 from the building. As display 600 shows a translucent depiction of the walls surrounding the virtual window, the viewer can see that the view from a different location within the building offers a better view of beach 606 than the view from the location associated with virtual window 602. In some implementations, a hotel provides the virtual windows to a future client when the client is making reservations. In a further embodiment, a virtual display is used by emergency personnel such as police, border patrol agents, Medevac, and the like to aid the emergency personnel in identifying desired locations to perform emergency duties. For example, a police officer performing surveillance on a house uses a virtual display to identify ideal locations to watch a suspected criminal.

Figure 7:
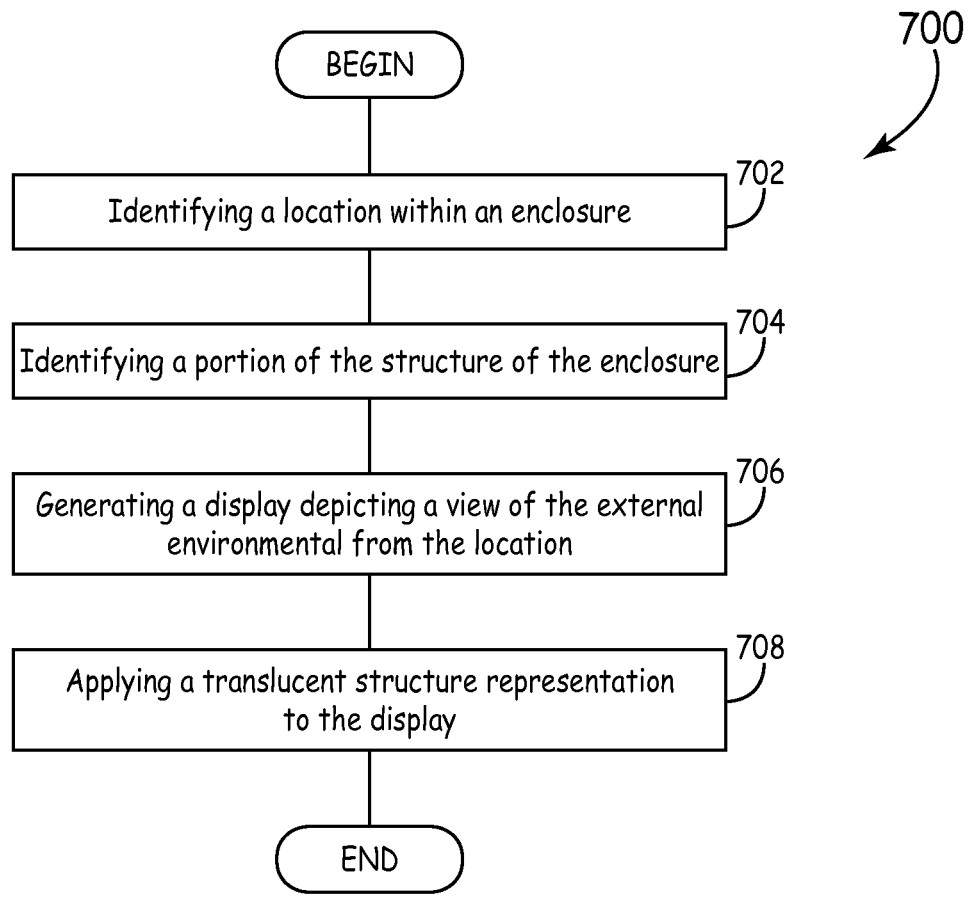
FIG. 7 is a flow chart diagram describing the application of a structure representation to a display according to one embodiment.

FIG. 7 is a flow chart diagram describing a method 700 for applying a structure representation to a display. Method 700 can be performed by system 100 described above. At block 702, a location within an enclosure is identified. At block 704, a portion of the structure of the enclosure is identified. The identification of both the location within the enclosure and the structure of the enclosure allows a processing unit to identify a portion of the structure that interferes with the view of the external environment from within the enclosure. The identified portion of the enclosure that interferes with the view of the external environment is used for display purposes.

At block 706, a display depicting a view of the external environment from the location is generated. For example, when the enclosure is the body of an airplane, a two dimensional or three dimensional image from satellite photos is used to represent the view of external environment of the airplane. At block 708, a translucent structure representation is applied to the display. For example, a translucent structure representation of the structure is overlaid onto the depicted view of the environment. In some embodiments, the translucency can be adjusted.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed:
1. A method comprising:
   identifying a location within an enclosure, the location referenced against an external environment containing the enclosure;
   identifying a portion of a structure of the enclosure, the portion of the structure existing between the location and the external environment and blocking a view of the external environment;
   generating, on a display device, a view of the external environment from the location; and
   simultaneously generating, on the display device, a translucent structure representation, the translucent structure representation being a visual depiction of the portion of the structure and appearing in front of the generated view of the external environment without blocking the generated view of the external environment.

2. The method of claim 1, further comprising adjusting the translucency of the structure representation.

3. The method of claim 1, further comprising applying an external structure representation to the display, the external structure representation relating the view of the external environment to an external portion of the structure of the enclosure.

4. The method of claim 1, further comprising representing points of interest in the external environment on the display.

5. The method of claim 1, further comprising:
generating, on a second display device, a second view of the external environment from a second location within the enclosure; and
simultaneously generating, on the second display device, a second structure representation to the second display, the second structure representation relating a second portion of the structure to the second view.

6. The method of claim 5, further comprising providing instructions that direct a user to view a point of interest that is viewable in the second view but not viewable in a first view of the external environment.

7. An apparatus comprising:
a display device for displaying visual images within an enclosure;
a location device configured to determine a location within the enclosure in reference to an external environment;
at least one memory device configured to store data representing a visual image of the external environment; and
a processing device configured to command the display device to simultaneously generate (i) a view of the external environment from the location and (ii) a structure representation, the structure representation being a visual depiction of a structure in the enclosure and appearing in front of the generated view of the external environment without blocking the generated view of the external environment.

8. The apparatus of claim 7, wherein the structure representation is a translucent overlay over the depicted view of the external environment.

9. The apparatus of claim 8, further comprising a user interface that allows a user to adjust the translucency of the structure representation.

10. The apparatus of claim 7, wherein the processing unit is further configured to apply an external structure representation to the display, the external structure representation relating the view of the external environment to an external portion of the structure of the enclosure.

11. The apparatus of claim 7, wherein the processing unit is further configured to:
generate a second display depicting a second view of the external environment from a second location within the enclosure; and
apply a second structure representation to the second display, the second structure representation relating a second portion of the structure to the second view.

12. The apparatus of claim 7, wherein the display device is at least one of:
a single display;
a plurality of displays;
a flexible display;
a touchscreen display; and
a three dimensional display.

13. The apparatus of claim 12, wherein the flexible display is located proximate to a transparent portion of the structure.

14. The apparatus of claim 7, wherein:
the location within the enclosure is a first location; and
the display device directs the user to a second location in the enclosure.

15. The apparatus of claim 7, wherein:
the location within the enclosure is a first location; and
the apparatus further comprises a user interface configured to allow a user to select different views of the external environment from a plurality of locations in the enclosure that are different than the first location.

* * * * *